3,775,314
METHOD AND APPARATUS FOR MIXING GASES WITH WATER

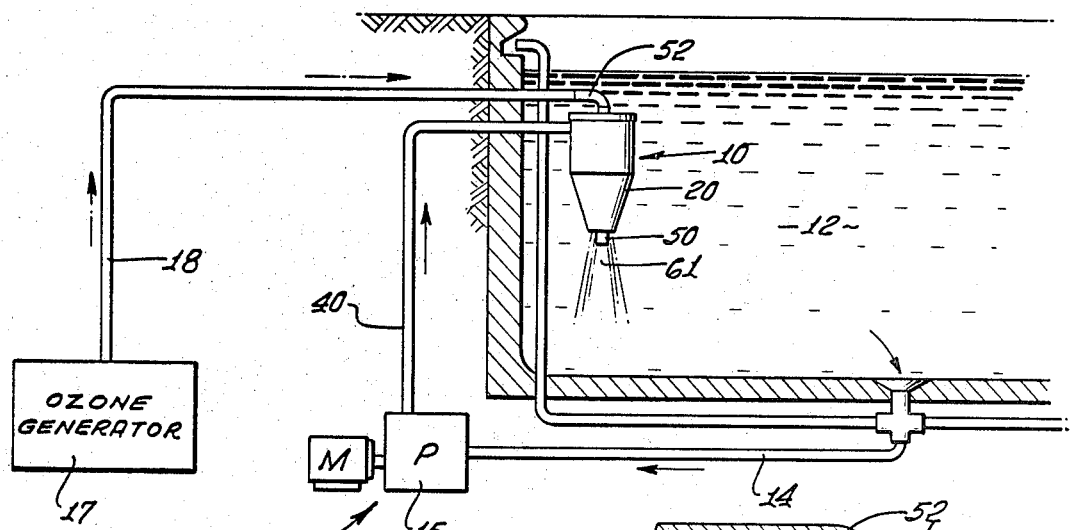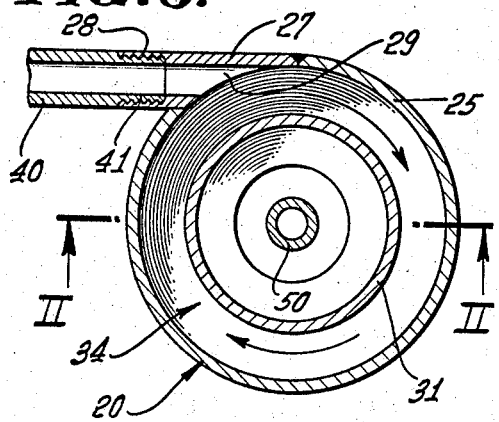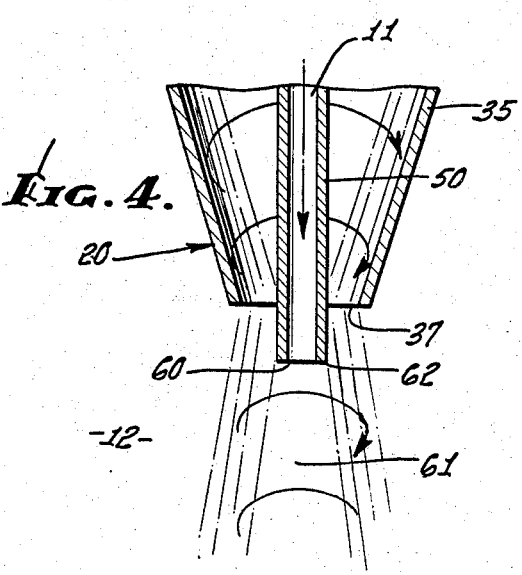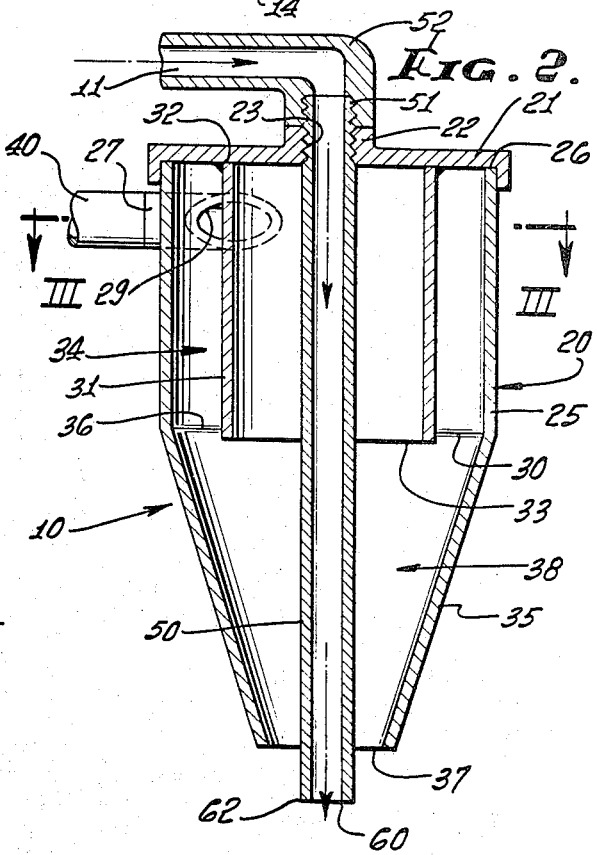

Stuart W. Beitzel, Santa Monica, and Robert F. Edwards, Northridge, Calif., assignors to Water Treatment Corporation, City of Industry, Calif.
Continuation-in-part of abandoned application Ser. No. 138,585, Apr. 29, 1971. This application June 7, 1971, Ser. No. 150,642
Int. Cl. C02b 1/38
U.S. Cl. 210—63                    13 Claims

ABSTRACT OF THE DISCLOSURE

A whirling mass of fluid in a high pressure zone is injected into a body of water to be purified, said body of water having a pressure lower than that in the high pressure zone, thereby creating in said body of water a partial vacuum zone containing water and water vapor, the temperature and pressure in said partial vacuum zone being less than about 25° C. and 10 p.s.i., respectively; introducing oxygen and/or ozone gas at a pressure of less than about 15 p.s.i. into said partial vacuum zone, thereby forming bubbles of said gas in said water and forming at the surface of said bubbles water vapor which causes the surface of said bubbles to cool to a temperature at which expanding water vapor condenses on said surface of said bubbles to form a clathrate molecule compose of a crystalline film of water with a molecule of oxygen or ozone inside, introducing said clathrate molecule into the water to be purified and melting said crystalline film thereby releasing the oxygen or ozone molecule into the body of water. The apparatus includes a cylindrical shaped hollow housing with an opening for introducing a whirling fluid into a body of water and a gas pipe for introducing oxygen or ozone gas into the partial vacuum formed by the introduction of said whirling fluid into said body.

CROSS REFERENCE TO RELATED APPLICATION

This application is a continuation-in-part of our copending application entitled "Method and Apparatus for Increasing the Concentration and Retention Time of Ozone in Water," Ser. No. 138,585, filed Apr. 29, 1971, and now abandoned.

BACKGROUND OF THE INVENTION

As our population grows and as technology becomes more and more complex, the need for water has greatly increased thereby increasing the problem of purifying water. One of the best ways of purifying water to eliminate undesirable organisms therein (e.g. bacteria, algae and slime) is the use of oxygen or ozone (which decays to oxygen).

Ozone ($O_3$) is the anhydride of $HO_2$ and therefore ozone may exist in water as either a dissolved gas or in its hydrated form ($HO_2$). Both $O_3$ and $HO_2$ are free radicals and decay to $O_2$ or $H_2O$, respectively, in a very short period of time. When these two free radicals decay a free, atom of oxygen is released which is seeking to return to its normal state by "attacking" any substance which can be oxidized. Ozone, therefore, will destroy a large number of undesirable organic materials normally found in unpurified water.

One of the main problems that has prevented the use of ozone for purifying water is the fact that, as noted above, ozone exists as a free radical in water and therefore rapidly degrades at which point it no longer is useful in purifying water. Moreover, the solubility of ozone in water is severely limited and therefore very little ozone can be dissolved in water.

The most common way to dissolve ozone or oxygen in water is to mix air or, in the case of ozone, a mixture of air and ozone, e.g. containing from about ½% to 2% by weight of ozone) with the water to be purified utilizing a mechanical method such as gas-water two-phase mixer (e.g. a Venturi mixer). Two-phase mixers rely on a concentration gradient to transport the gas to be mixed with water across an interface (e.g. a bubble of gas in water). Two-phase mixers attempt to enhance the above mixing action by increasing the interface contact area (e.g. producing many small bubbles of gas) and/or increasing the concentration gradient by operating at higher pressures where the solubility of the gas in the water is increased.

Neither of the foregoing are satisfactory solutions to the problem because the energy cost of making small bubbles or increasing the pressure to improve solubility are both very high. Moreover, even if a greater amount of ozone is placed in solution in the water, this still does not solve the problem of the rapid rate of degradation of ozone in water.

SUMMARY OF THE INVENTION

From the foregoing it is readily apparent that it is a desideratum in the art to provide a method and a device which will cheaply and economically mix oxygen or ozone with water in such a manner that the concentration and retention time is increased over that accomplished by merely mechanically mixing water with oxygen or ozone.

We have discovered that the $O_2$, $HO_2$ or $O_3$ can be stabilized in water by forming a clathrate compound. A clathrate is a homogeneous crystalline solid consisting of a host and a guest molecule; the guest molecule is enclosed in a closed cavity or cage formed by the host molecule. It is possible to use water as the host because water forms closed cavities on freezing from the gas phase.

We have discovered that ozone and oxygen are correctly dimensioned so that they will "fit" in a clathrate ice form of water. Thus, the formation of clathrate ice in the presence of a gas containing either oxygen or ozone in effect measures out and selects oxygen and ozone molecules since they fit into the voids formed in the clathrate ice.

The probable formula for the ice clathrate would be: $O_3 \cdot 5\%\,H_2O$, $HO_2 \cdot 5\%\,H_2O$ or $O_2 \cdot 5\%\,H_2O$. Thus, the amount of ozone or oxygen that can be dissolved increases to about 5¾ molecules of water, per molecule of ozone or oxygen, from about 100,000 molecules of water per molecule of gas, the latter being the amount of ozone or oxygen which can be dissolved in water utilizing mechanical mixing.

This is an increase in solubility or concentration far greater than could be achieved by reducing bubble size or increasing pressure in the classical mixing concept.

Moreover, the ozone imprisoned in the clathrate is not free to degrade until the crystalline water is reformed into another crystalline array thus freeing the ozone. Additionally, the oxygen is not free to escape from the water. Therefore, the retention time of ozone and oxygen in water is greatly increased through the utilization of our invention.

Therefore, the primary object of the present invention, is to provide and embody a method and apparatus for purifying water by increasing the concentration and retention time of ozone and oxygen in water.

A further object of the present invention is to embody and provide a process and device for purifying water utilizing ozone and/or oxygen by creating a partial vacuum in the body of water to be purified and injecting ozone and/or oxygen gas into said partial vacuum, said partial vacuum being formed by injecting into said body of water a whirling mass of fluid having sufficient velocity to create said partial vacuum.

3

A still further object of the present invention is to disclose a method for forming clathrate molecules in situ in water, said clathrate molecules being formed of a film of crystalline water in which ozone or oxygen is entrapped.

Still another object of the present invention is to disclose a method and device for purifying water utilizing oxygen and/or ozone by injecting same into water having a partial vacuum and temperature such that water vapor is formed in the partial vacuum thereby forming clathrate ice containing ozone or oxygen.

The foregoing objects, and others which will be apparent to those skilled in the art, are accomplished by the present invention which, generally stated, comprises the provision of a method for purifying water by increasing the concentration and retention time of ozone and/or oxygen in water relative to the amount injected into the water. This is accomplished by forming a whirling mass of fluid in a high pressure zone and injecting said whirling mass of fluid into a body of water, said body of water having a pressure lower than that in the high pressure zone, thereby forming a vortex in said body of water having a partial vacuum zone containing water and water vapor, the temperature in said partial vacuum zone being less than about 30° C. and the pressure being less than about 10 p.s.i.; introducing oxygen and/or ozone gas into said partial vacuum zone at a pressure of less than about 15 p.s.i., preferably less than 14 p.s.i. thereby forming bubbles of gas in said water and forming water vapor at the surface of said bubbles which causes the surface of said bubbles to cool sufficiently to condense water vapor on the surface of the bubbles to form a clathrate molecule composed of a crystalline film of water, about 10 angstroms thick, with a molecule of zone or oxygen inside; introducing said clathrate molecule into the body of water to be purified; and melting said crystalline film of water thereby releasing the ozone or oxygen molecule into the body of water.

The apparatus includes means for receiving a supply of fluid under pressure causing it to whirl to produce a vortex therein at a reduced pressure below atmospheric pressure and directing such whirling fluid into a body of water to be purified, there being water and water vapor in said vortex; and conduit means for receiving gas from a supply thereof and directing the same into said vortex whereby said gas is placed in contact with said water and water vapor under said reduced pressure and whirled therewith by said fluid into said body of water.

The partial vacuum in the vortex formed in the body of water by the whirling mass of fluid should be 10 p.s.i. or less. The temperature of the water and water vapor in the vortex should be between the freezing point of water and 30° C.

The mass and speed of the whirling mass injected into the body of water controls the pressure of vacuum formed. This is easily determined by one skilled in the art and does not constitute part of the invention herein. It should also be noted that if, for example, water is utilized as the fluid the velocity of the water injected into the body of water would be slower to create a given vacuum than if the fluid utilized were a gas such as air. This is because the mass of water is greater than a gas and therefore the velocity of the water when it enters the body of water would not be decreased as much as if the fluid were a gas.

In the following detailed description all parts and percentages are by weight unless otherwise stated.

BRIEF DESCRIPTION OF THE DRAWINGS

FIG. 1 diagrammatically illustrates a system for purifying water utilizing an exemplary embodiment of the mixing device according to our invention.

FIG. 2 is an enlarged fragmentary cross-sectional view taken along the plane II—II of FIG. 3 showing the internal construction of the mixing device of FIG. 1.

FIG. 3 is a fragmentary cross-sectional view taken along the plane of III—III of FIG. 2.

4

FIG. 4 is an enlarged fragmentary view of the lower portion of the apparatus of FIG. 2, showing the mixing device in operation to provide the reduced pressure region of the fluid vortex in which the lower end of the gas pipe is located according to our invention.

DETAILED DESCRIPTION OF THE PREFERRED EMBODIMENTS

Referring now to the drawing, and more particularly to FIG. 1, the exemplary mixing device 10 for introducing gas 11, (either ozone, oxygen or a mixture thereof) into a body of water 12 such as a swimming pool, utilizing the method and apparatus of this invention is shown as part of a recirculating purification system 13. In the recirculating purification system 13, the water 12, which is to be purified, is drawn from the bottom of the swimming pool through pipe 14 by pump 15, and returned by pipe 40 to the device 10 where it is injected, at a pressure of between 20 and 35 p.s.i. in the exemplary embodiment) and at 10 gallons per minute, into the mixing device 10. Gas 11, which in this exemplary embodiment, is a mixture of air containing about ½% to 2%, by weight, of ozone, is generated by an ozone generator 17 which is a conventional generator such as, for example, that shown in U.S. Pat. 3,455,803. It is emphasized, however, that instead of an ozone generator an oxygen source could be utilized for supplying oxygen or an oxygen containing gas such as air.

The mixture of ozone and air is conveyed by pipe 18 to the mixing device 10 to be injected into the partial vacuum 61 formed in the body of water 12 by the whirling mass of fluid which, in the exemplary embodiment, is water exiting from lower open end 37 of mixing device 10.

Generally stated, the improved mixing device 10 includes an open ended housing 20 with a fluid receiving space 34 and a fluid accelerating space 38, a fluid pipe 40 for conducting a fluid into the housing 20, and conduit means, such as gas pipe 50, for conducting gas 11 into and through housing 20. As particularly contemplated within the present invention, the lower end 60 of conduit means 50 is located in the partial vacuum created in vortex 61 in the water 12. In the preferred exemplary embodiment, water is introduced into housing 20 and accelerated, but it is emphasized that any fluid, either liquid or gas, can be utilized to create a vortex having partial vacuum of 10 p.s.i. or less in the body of water 12.

In the preferred exemplary embodiment the water is conducted into the mixing device at a pressure of 22 p.s.i. and at a rate of 10 gallons per minute which, when accelerated in the fluid accelerating space 38, and injected into the water 12 creates a partial vacuum in partial vacuum zone or vortex 61 of about 5 p.s.i. In the preferred exemplary embodiment, the water is at a temperature of about 25° C. and the partial vacuum provided by zone 61 creates an abundance of expanding water vapor which will condense on the bubbles of gas 11 being formed in the partial vacuum zone 61 because gas 11 is drawn into partial vacuum zone 61 through gas pipe 50. It is important that the gas 11, which in the exemplary embodiment is a mixture of ozone and oxygen be drawn into partial vacuum zone 61 by the partial vacuum.

Referring now to FIG. 2, the housing 20 is generally hollow and includes an upper or top wall 21 having a centrally located, vertical, internally threaded boss 22 around a hole 23. The housing 20 has a cylindrical wall 25, the upper edge 26 of which, joins to top wall 21. The wall 25 has a tangential boss 27 therein adjacent the top wall 21. The boss 27 is internally threaded with an opening 29 therethrough and through the cylindrical wall 25. The wall 25 also has a lower edge 30. An inter cylindrical wall 31 is located in the housing 20 and has the upper end 32 thereof secured to the top wall 21 to depend therefrom concentrically with the cylindrical wall 25 and terminate in a lower end 33 adjacent the lower end 30 of the wall 25. The concentrically located cylindrical walls 25 and 31 together with the top wall 21, define a fluid receiving and vortex forming space 34 for receiving the water 12.

The housing 20 has an inverted frustrum wall 35 below the cylindrical wall 25 with the upper end thereof having the same diameter as the cylindrical wall 25 to be attached thereto and provide a smooth juncture therebetween. The frustrum wall 35 gradually decreases diameter from the upper end 36 thereof to terminate in a lower open end 37 while defining a fluid vortex accelerating space 38.

The device 10 also has a fluid pipe 40 with one end connected to the pump 15 to be supplied with water 12 (which in the exemplary embodiment is at a pressure of 22 p.s.i.) while the other end 41 is externally threaded for turning into the threads 28 of the tangential boss 27 to conduct the pressurized water 12 through the opening 27 and into the fluid receiving space 34 tangentially. The water 12 passes into the fluid receiving space and along the adjacent surfaces of the cylindrical wall 25 and 31 onto the frustrum wall 35 and into the fluid vortex accelerating space 38. The fluid vortex 12 continues to descend to that the speed of the water increases as the diameter decreases, until the whirling mass passes out of lower open end 37 into the body of water 12 thereby forming a partial vacuum of about 5 p.s.i.

The device 10 has a gas pipe 50 for conducting gas 11 into the partial vacuum. The gas pipe 50 has an externally threaded upper end 51 which mates with the threads of the boss 22 to depend from the upper wall 21 of the housing through the fluid receiving space 34 and the fluid accelerating space 38. Enough of the threads of the upper end 51 protruded above the boss 22 to receive an internally threaded coupling 52 which couples the gas line 18 thereto. The gas line 18 is connected from a supply of ozone which is carried thereby, to and through the gas pipe 50 and into the water 12.

We have discovered that a partial vacuum 61 exists in the water 12 and, that by introducing the ozone 11 into this region, that the ozone and the water vapor formed in the partial vacuum will form clathrate molecules which will be dispersed throughout the body of water 12.

Thus, to accomplish the foregoing, we have extended the gas pipe 50 to locate the lower or exhaust end 60 thereof in this region 61. Accordingly, the gas pipe 50 extends through the lower open end 37 of the housing and thereby locates the edge 62 of the lower end 60, as shown in FIG. 4, just protruding into the fluid vortex 61.

Utilizing the method and device of the present invention, as set forth in the preferred exemplary embodiment above, it was found that after introducing air containing 1% by weight of ozone for 30 minutes, the amount of ozone dissolved in the water was 2.8 parts per million. Under the same conditions utilizing a Venturi mixer the amount of ozone after 30 minutes was only 1.2. After ceasing to inject ozone into the water, it was found that after 10 minutes the amount of ozone in water utilizing the present invention was approximately 2.0 parts per million whereas utilizing the Venturi mixer the amount of ozone was only .8 parts per million. This trend continued so that after 30 minutes there was .8 p.p.m. of ozone in the water when utilizing the present invention and only .4 p.p.m. of ozone when utilizing the Venturi mixture. Thus, it can be seen that the present invention provides a greater initial concentration of ozone which remains in the water a significantly longer period of time than when utilizing ordinary mechanical mixing devices. In addition, the concentration of oxygen was greatly increased.

Utilizing the same apparatus and conditions as set forth above air, with no ozone, was introduced through pipe 18 to mixing device 10 and injected into partial vacuum 61. The amount of oxygen in the water after 30 minutes was 20 parts per million as compared with about 10 parts per million utilizing a Venturi mixer.

It will be understood that the foregoing description is only illustrative of the present invention and it is not to be limited thereto. Many other specific forms of devices, pressures, temperatures, etc. will be apparent to those skilled in the art and all substitutions, alterations and modifications of the present invention which come within the scope of the appended claims or to which the present invention is readily susceptible without departing from the spirit and scope of this disclosure are considered a part of the present invention.

We claim:

1. In a cyclone mixing device for intermixing a gas with a body of water to be purified, said device including
   a hollow housing having an end wall; a cylindrical shaped wall attached to the end wall and defining a liquid receiving space; and an inverted frustrum shaped wall attached to the cylindrical wall oppositely of the end wall and defining a liquid accelerating space therewith which is joined to the liquid receiving space at one end and open at the other end, and
   a liquid inlet positioned tangentially to the cylindrical wall to direct liquid under pressure into the fluid receiving space around the cylindrical wall to form a whirling mass thereof which passes in to the liquid accelerating space where the rotational speed of the liquid is increased before it passes out the open end, there being a region of reduced pressure formed in a vortex of said water outside the housing adjacent the open end thereof the improvement comprising the provision of:
      gas conduit means and means for mounting it in association with said housing for conducting the gas into region of reduced pressure in the whirling mass of liquid outside the housing adjacent the open end thereof to mix the gas therewith as said whirling mass of liquid is mixed into said body of water.

2. The improvement as in claim 1 wherein the gas conduit means is a gas pipe with an exhaust end thereof located outside the housing adjacent the open end thereof.

3. The improvement as in claim 2 wherein the gas tube is located co-axially with the other end of the housing.

4. The improvement as in claim 2 wherein the gas pipe is located within the housing to extend out through the other open end thereof to locate the exhaust end in the region of reduced pressure.

5. In a mixing device for increasing the concentration and retention time of oxygen or ozone in water, said device including a cylindrical shaped hollow housing in an outlet opening at one end of the housing and a fluid located near the other end and tangentially to the housing for introducing fluid into the inside of the housing for forming a whirling mass of fluid before it passes out the open end, the improvement comprising the provision of:
   gas conduit means associated with a supply of ozone and having a gas outlet end located outside of the housing and adjacent to the open end thereof and in the partial vacuum zone created by the fluid for introducing said oxygen or ozone into said zone.

6. A device according to claim 5 wherein the gas conduit means includes a conduit portion located within the hollow housing and extending through the open end.

7. A method for purifying water by increasing the concentration and retention time of a gas selected from the group consisting of ozone and oxygen therein relative to the amount of gas injected which comprises:
   forming a whirling mass of fluid in a high pressure zone and injecting said whirling mass of fluid into a body of water, said body of water having a pressure lower than that in the high pressure zone, to form in said body of water a partial vacuum zone containing water and water vapor, the temperature and pressure in said partial vacuum zone being less than about 30° C. and 10 p.s.i., respectively;

introducing a gas selected from the group consisting of ozone and oxygen at a pressure of less than about 15 p.s.i. into said partial vacuum zone, thereby forming bubbles of gas in said water and forming water vapor at the surface of said bubbles which causes the surface of said bubbles to cool to a temperature at which water vapor condenses on said surface, to form a clathrate molecule composed of a crystalline film of water with a molecule of said gas inside;

introducing said clathrate molecule into the water to be purified; and melting said crystalline film of water to liquid water releasing the gas molecule into the water to be purified.

8. A method according to claim 7 wherein the partial vacuum zone has a temperature of less than about 25° C.

9. A method according to claim 7 wherein the gas is ozone.

10. A method according to claim 7 wherein the pressure in the high pressure zone is between 35 p.s.i. and 20 p.s.i.

11. A method according to claim 7 wherein the whirling mass of fluid is water.

12. A method according to claim 9 wherein the ozone gas is admixed with air in an amount of from ½ to 2%, by weight, of the mixture of air and ozone, prior to introducion of the gas into siad partial vacuum zone.

13. A method according to claim 12 wherein the amount of ozone in air is between ½% and 1% by weight.

References Cited
UNITED STATES PATENTS

| | | | |
|---|---|---|---|
| 3,531,406 | 9/1970 | Smith et al. | 210—62 |
| 3,640,516 | 2/1972 | Willinger | 210—169 X |

MICHAEL ROGERS, Primary Examiner

U.S. Cl. X.R.

210—198, 512; 261—79